United States Patent
Komaki

(10) Patent No.: US 7,868,653 B2
(45) Date of Patent: Jan. 11, 2011

(54) CLOCK SUPPLY APPARATUS AND CLOCK SUPPLY METHOD

(75) Inventor: Hiroaki Komaki, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/637,304

(22) Filed: Dec. 14, 2009

(65) Prior Publication Data

US 2010/0244922 A1 Sep. 30, 2010

(30) Foreign Application Priority Data

Mar. 31, 2009 (JP) ............................. 2009-086812

(51) Int. Cl.
*H03K 19/003* (2006.01)

(52) U.S. Cl. .......................... 326/30; 326/32

(58) Field of Classification Search ........................ None
See application file for complete search history.

(56) References Cited

U.S. PATENT DOCUMENTS

| 7,383,373 | B1 * | 6/2008 | Strickland ................... 710/315 |
| 2004/0046587 | A1 * | 3/2004 | Lindsay et al. ................. 326/30 |
| 2006/0285417 | A1 * | 12/2006 | Washburn et al. ........... 365/226 |

FOREIGN PATENT DOCUMENTS

| JP | 5-324121 A | 12/1993 |
| JP | 9-200006 | 7/1997 |
| JP | 2000-276251 A | 10/2000 |
| JP | 2002-33775 | 1/2002 |
| JP | 3904339 B2 | 1/2007 |
| JP | 2007-272796 A | 10/2007 |
| JP | 2008-227635 | 9/2008 |

OTHER PUBLICATIONS

Japanese Office Action dated May 11, 2010, Japanese Patent Application No. 2009-086812.

* cited by examiner

*Primary Examiner*—Anh Q Tran
(74) *Attorney, Agent, or Firm*—Patterson & Sheridan, LLP

(57) ABSTRACT

According to one embodiment, a clock supply apparatus according to one embodiment of the invention includes a first transmission line connected to a clock generator that generates clock signals, a second transmission line connected to a clock supply destination having input impedance different from output impedance of the clock generator, a capacitor that capacitively couples the first and second transmission lines, a pull-up resistor that is provided on the first transmission line to suppress reflection of the clock signal, and a pair of voltage divider resistors that apply potential obtained by voltage division to the second transmission line as a reference potential of the clock signal. The impedance of the pair of voltage divider resistors on the second transmission line is set to match the input impedance of the clock supply destination.

4 Claims, 5 Drawing Sheets

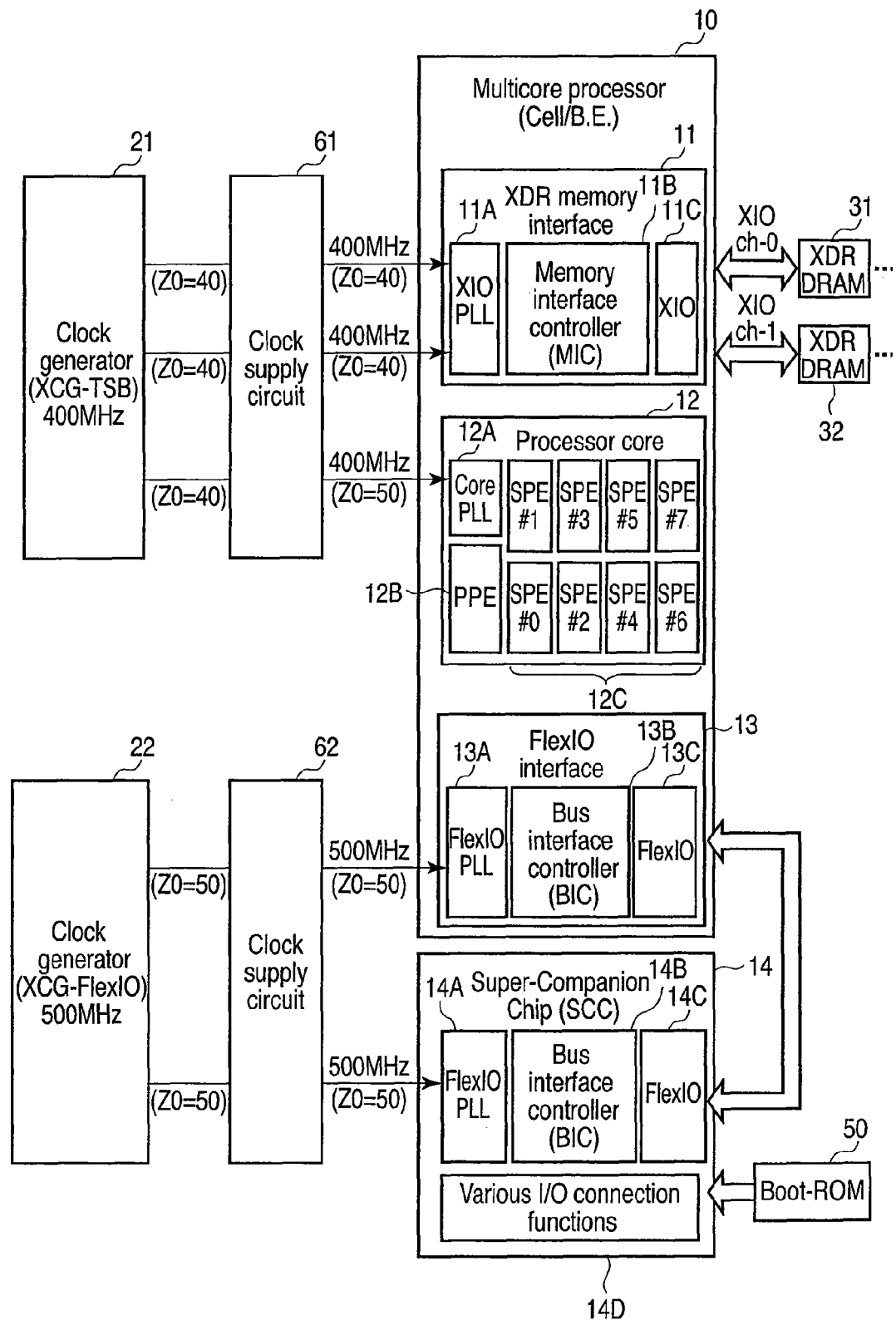
F I G. 1

FIG. 4

| Portion | Key parameter |
|---|---|
| 2.5V_XCGVDDO | 2.5V±5% [V] |
| 1.2V_YCVDDIO | 1.2V±5% [V] |
| 1.5V_CFCVDDA | 1.5V±5% [V] |
| RY1 | 39.2 or 40.2 [Ω] |
| RY2 | 165 or 169 [Ω] |
| RY3 | 51.1 or 52.3 [Ω] |
| CY1 | 2.7 [nF] |
| RP0 | Non-connection (conventional case : 316 [Ω]) |
| RP1 | 40.2 [Ω] (conventional case : 59 [Ω]) |
| RPS | 10.2 [Ω] (conventional case : Not present) |
| RP2 | 100 [Ω] |
| RP3 | 100 [Ω] |
| CP1 | 2.7 or 2.2 [nF] |
| RI | 348 or 350 (=200+150) [Ω] |

FIG. 6

| Portion | Key parameter |
|---|---|
| 2.5V_XCGVDDO | 2.5V±5% [V] |
| 1.2V_YCVDDIO | 1.2V±5% [V] |
| 1.5V_CFCVDDA | 1.5V±5% [V] |
| RY1 | 39.2 or 40.2 [Ω] |
| RY2 | 165 or 169 [Ω] |
| RY3 | 51.1 or 52.3 [Ω] |
| CY1 | 2.7 [nF] |
| RP0 | Non-connection (conventional case : 316 [Ω]) |
| RP1 | 49.9 [Ω] (conventional case : 59 [Ω]) |
| RPS | Non-connection (conventional case : Not present) |
| RP2 | 100 [Ω] |
| RP3 | 100 [Ω] |
| CP1 | 2.7 or 2.2 [nF] |
| RI | 348 [Ω] |

CLOCK SUPPLY APPARATUS AND CLOCK SUPPLY METHOD

CROSS-REFERENCE TO RELATED APPLICATIONS

This application is based upon and claims the benefit of priority from Japanese Patent Application No. 2009-086812, filed Mar. 31, 2009, the entire contents of which are incorporated herein by reference.

BACKGROUND

1. Field

One embodiment of the present invention relates to a clock supply apparatus and clock supply method applied to a processor having a plurality of clock input terminals and more particularly to a clock supply apparatus and clock supply method applied to a processor having clock input terminals whose input impedances are different from one another.

2. Description of the Related Art

Recently, game consoles and blade servers are configured by means of microprocessors of novel architectures containing a plurality of processor cores. For example, as the microprocessor, much attention is paid to a Cell Broadband Engine (Cell/B.E.). The Cell/B.E. is a multicore processor having a general processor core that is called a Power Processor Element (PPE) and eight processor cores that are each called a Synergistic Processor Element (SPE) suitable for a multimedia process. The SPE is configured to process multimedia data at high speed, linearly enhance the performance thereof with an increase in the number of cores and make it easy to perform the software control operation. The PPE schedules assignments of processes to the SPEs to efficiently operate the plural SPEs. Further, the Cell/B.E. uses XIO (registered trademark) of Rambus Co. as a memory interface and uses FlexIO as an external IO interface.

In the processor system using the Cell/B.E., communication between the Cell/B.E. and XDR (registered trademark) of a DRAM used as a main memory thereof is performed by means of an XIO-PLL clock and an operation clock for the Cell/B.E. processor core is generated from a Core-PLL clock generator. Since the impedance specifications required for the clock signals of the XIO-PLL clock and Core-PLL clock are different although they have the same frequency, the clocks are supplied to the XIO-PLL and Core-PLL of the Cell/B.E. from a plurality of independent clock generators (XCG).

Conventionally, the clock distribution technique for reducing spurious electromagnetic radiation caused by impedance mismatching between the clock transmission lines of a digital processing apparatus is known (for example, see Jpn. Pat. Appln. KOKAI Publication No. 2007-272796). With the above technique, a plurality of clock signals obtained by distributing an output of a single clock generation source are subjected to impedance conversion so as to attain matching in different transmission line impedances.

The number of clock generation sources can be reduced by using the technique of Patent Document 1. However, since the technique utilizes an emitter-follower transistor amplifier circuit for impedance conversion, the upper limit of the clock frequency tends to be limited by the response characteristic of the transistor amplifier circuit and the cost will be raised by using the transistor.

Further, the current clock generator (XCG) has four clock generation sources that generate clock signals at the same frequency with the same output impedance as a clock driver. In a processor system using the Cell/B.E., if a clock generator is provided for each impedance specification, the number of clock generation sources that are not operated is wastefully increased. Specifically, two clock generators whose impedance specifications are different are required and this increases the cost.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram schematically showing the whole configuration of a processor system according to one embodiment of this invention.

FIG. 4 is a diagram showing key parameters applied to the first clock supply apparatus shown in FIG. 3.

FIG. 6 is a diagram showing key parameters applied to the first clock supply apparatus of the modification shown in FIG. 5.

DETAILED DESCRIPTION

Figure 2:
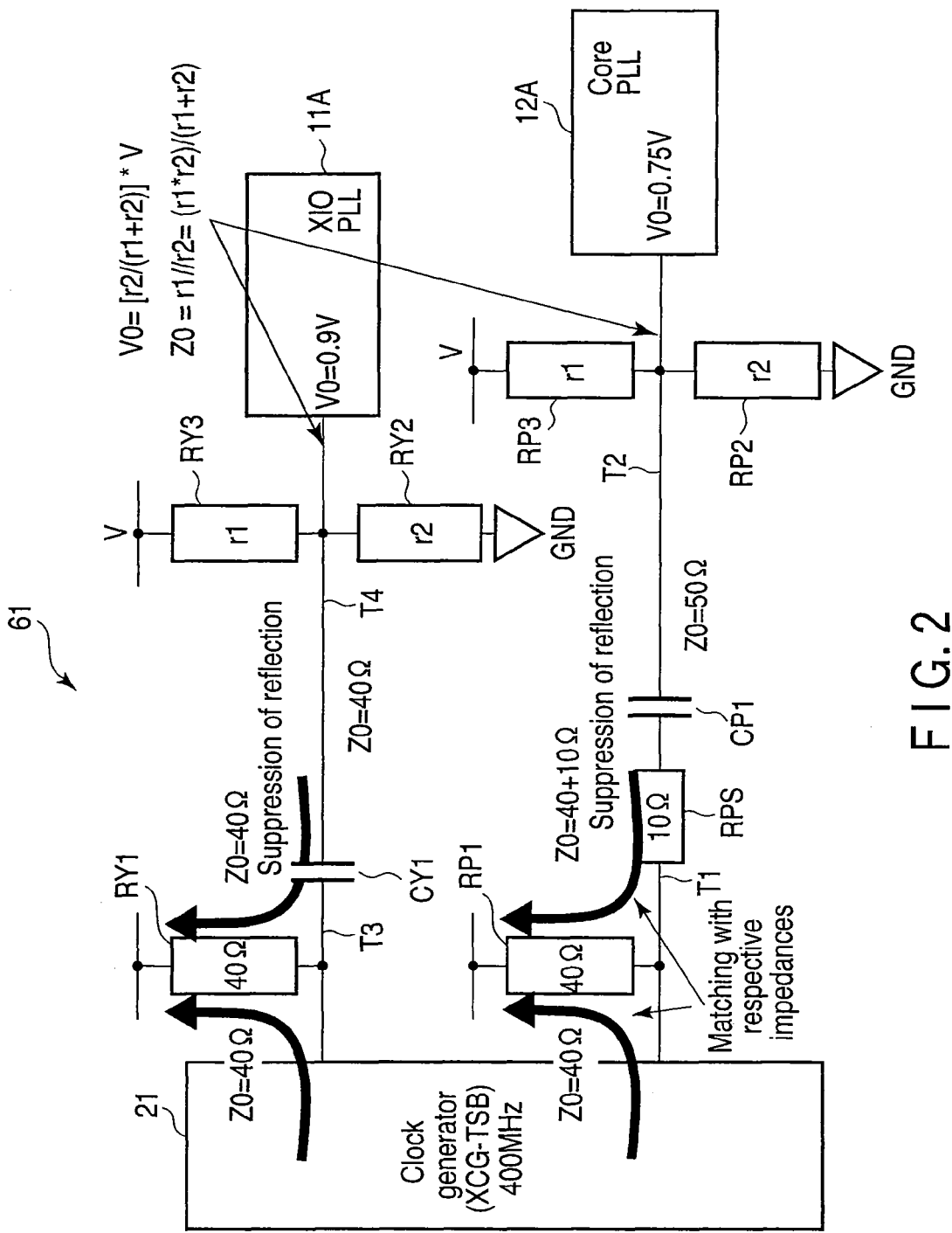
FIG. 2 is a diagram for illustrating the basic configuration of a first clock supply apparatus shown in FIG. 1.

Various embodiments according to the invention will be described hereinafter. In general, according to one embodiment of the invention, there is provided a clock supply apparatus comprising a first transmission line (T1) connected to a clock generator (21) that generates clock signals, a second transmission line (T2) connected to a clock supply destination (12A) having input impedance different from output impedance of the clock generator, a capacitor (CP1) that capacitively couples the first and second transmission lines, a pull-up resistor (RP1) that is provided on the first transmission line to suppress reflection of the clock signal, and a pair of voltage divider resistors (RP3, RP2) that apply potential obtained by voltage division to the second transmission line as a reference potential of the clock signal, wherein the impedance of the pair of voltage divider resistors on the second transmission line is set to match the input impedance of the clock supply destination.

In the clock supply apparatus, the clock signal from the clock generator is superimposed on the reference potential via the capacitor and supplied to the clock supply destination. Since the impedance of the second transmission line is set independently of the impedance of the first transmission line, transmission loss due to mismatching of the impedance can be reduced even if the input impedance of the clock supply destination is different from the output impedance of the clock generator. Further, since the pair of voltage divider resistors is used for impedance matching with respect to the clock supply destination, an increase in cost can be substantially neglected and the transmission efficiency of the clock signal at high frequency can be enhanced.

Next, the processor system according to one embodiment of this invention is described with reference to the accompanying drawings.

FIG. 1 schematically shows the whole configuration of the processor system. The processor system has a multicore processor 10 having different impedance specifications with respect to plural clock signals used for the operation. The multicore processor 10 is a Cell/B.E. [Cell Broadband Engine] having an XDR memory interface 11 for an XDR memory used as a main memory, a processor core 12 and a FlexIO interface 13. The XDR memory interface 11 includes an XIO-PLL 11A, memory interface controller (MIC) 11B and XIO 11C. The processor core 12 includes a Core-PLL 12A, PPE 12B and eight SPEs 12C. Further, the FlexIO interface 13 includes a FIeXIO-PLL 13A, bus interface controller (BIC) 13B and FlexIO 13C.

The processor system further includes a Super-Companion Chip (SCC) 14, clock generator (XCG-TSB) 21, clock generator (XCG-FlexIO) 22, plural XDR DRAMs 31, plural XDR DRAMs 32, Boot-ROM 50, first clock supply circuit 61 and second clock supply circuit 62. The Super-Companion Chip (SCC) 14 is operated as a Southbridge function of the Cell/B.E. and includes a FleXIO-PLL 14A, bus interface controller (BIC) 14B, FlexIO 14C and various I/O connection function units 14D. For example, the I/O connection function units 14D are connected to the Boot-ROM 50. The Boot-ROM 50 is a memory that stores a boot/program code of the Cell/B.E. Further, the FlexIO 14C of the Super-Companion Chip (SCC) 14 and the FlexIO 13C of the multicore processor 10 are connected to each other. The plural XDR DRAMs 31, 32 are main memories of the Cell/B.E. The plural XDR DRAMs 31 are connected to the XIO 11C via an XIO channel (ch-0) and the plural XDR DRAMs 32 are connected to the XIO 11C via an XIO channel (ch-1).

The clock generator 21 has four clock generation sources each of which can generate clock signals at the frequency of 400 MHz with the output impedance of 40Ω as a clock driver. The clock generator 22 has four clock generation sources each of which can generate two clock signals at the frequency of 500 MHz with the output impedance of 50Ω as a clock driver. In the processor system, three of the four clock generation sources of the clock generator 21 are used and two of the four clock generation sources of the clock generator 22 are used. The first clock supply circuit 61 supplies two of the three clock signals output from the clock generator 21 to the XIO-PLL 11A and supplies the remaining clock signal to the Core-PLL 12A. Further, the second clock supply circuit 62 supplies one of the two clock signals output from the clock generator 22 to the FlexIO-PLL 13A and supplies the remaining clock signal to the FlexIO-PLL 14A. The XIO-PLL 11A has the input impedance of 40Ω with respect to the above two clock signals and the Core-PLL 12A has the input impedance of 50Ω with respect to the above clock signal. The output impedance of the clock generator 21 is made to match the input impedance of the XIO-PLL 11A and not to match the input impedance of the Core-PLL 12A. Therefore, it is necessary to consider the transmission loss of the first clock supply circuit 61 due to the impedance mismatching. On the other hand, the FlexIO-PLL 13A has the input impedance of 50Ω with respect to the above clock signal and the FlexIO-PLL 14A has the input impedance of 50Ω with respect to the above clock signal. The output impedance of the clock generator 22 matches the input impedances of the FlexIO-PLLs 13A, 14A. Therefore, it is not necessary to consider the transmission loss of the second clock supply circuit 62 due to impedance mismatching.

FIG. 2 is a diagram for illustrating the basic configuration of the first clock supply circuit 61 shown in FIG. 1. The clock generator 21 outputs clock signals as a pair of complementary pulses of opposite phases. The first clock supply circuit 61 transmits the complementary pulses by means of a pair of differential lines (that will be described later). However, in FIG. 2, there is shown a case wherein it is assumed that the clock signal for the XIO-PLL 11A and the clock signal for the Core-PLL 12A are each transmitted by means of a signal line of a normal system that does not use a pair of differential lines so that the basic configuration of the first clock supply circuit 61 can be easily understood.

The first clock supply circuit 61 has a first transmission line T1 connected to the clock generator 21 that generates the clock signal and a second transmission line T2 connected to the clock supply destination, that is, the Core-PLL 12A having an input impedance (=50Ω) different from the output impedance (=40Ω) of the clock generator 21. Further, the first clock supply circuit 61 includes a capacitor CP1, pull-up resistor RP1 and a pair of voltage divider resistors RP2 and RP3. The capacitor CP1 capacitively couples the transmission lines T1 and T2. The pull-up resistor RP1 suppresses reflection of the clock signal on transmission line T1. The pair of voltage divider resistors RP2 and RP3 apply a potential obtained by voltage division to transmission line T2 as a reference potential of the clock signal. The resistances of the voltage divider resistors RP2 and RP3 are set to make impedance Z0 of transmission line T2 match the input impedance (=50Ω) of the Core-PLL 12A.

A resistor RPS is inserted in the part of transmission line T1 that is closer to the capacitor CP1 than the pull-up resistor RP1. The resistance of the pull-up resistor RP1 is set to match the output impedance (=40Ω) of the clock generator 21. Further, the resistance of the resistor RPS is set to a value (=10Ω) that coincides with the difference between impedance Z0 (=40Ω) of the part of transmission line T1 that lies on the clock generator 21 side with respect to the resistor RPS and impedance Z0 (=50Ω) of transmission line T2. Therefore, impedance Z0 of transmission line T1 is made to match "40+10"Ω in response to reflection, that is, impedance Z0 (=50Ω) of transmission line T2.

Further, the first clock supply circuit 61 includes a third transmission line T3 connected to the clock generator 21 that generates clock signals and a fourth transmission line T4 connected to a clock supply destination, that is, the XIO-PLL 11A having the same input impedance (=40Ω) as the output impedance (=40Ω) of the clock generator 21. The first clock supply circuit 61 further includes a capacitor CY1, pull-up resistor RY1 and a pair of voltage divider resistors RY2, RY3. The capacitor CY1 capacitively couples transmission lines T3 and T4. The pull-up resistor RY1 suppresses reflection of the clock signal on transmission line T3. The pair of voltage divider resistors RY2 and RY3 apply a potential obtained by voltage division to transmission line T4 as a reference potential of the clock signal. The resistances of the voltage divider resistors RY2 and RY3 are set to make impedance Z0 of transmission line T4 match the input impedance (=40Ω) of the XIO-PLL 11A. The resistance of the pull-up resistor RY1 is set to match the output impedance (=40Ω) of the clock generator 21.

In this case, if the resistances of voltage divider resistors RP3 and RY3 are both set to "r1" and the resistances of voltage divider resistors RP2 and RY2 are both set to "r2", impedances Z0 of transmission lines T2 and T4 are both expressed by Z0=r1/r2=(r1*r2)/(r1+r2). Further, if the voltage obtained by voltage division by means of voltage divider resistors RP3 and RP2 or voltage divider resistors RY3 and RY2 is set to "V", the reference potential V0 of the clock signal is expressed by V0=[r2/(r1+r2)]*V.

In the basic configuration shown in FIG. 2, the resistances of the pair of voltage divider resistors RP2 and RP3 are set to make the impedance of the second transmission line T2 match the input impedance of the Core-PLL 12A. Further, the clock signal from the clock generator 21 is superimposed on the reference potential V0 (=0.75 V) via the capacitor CP1 and supplied to the Core-PLL 12A. Since the impedance of transmission line T2 is set independently of the impedance of transmission line T1, the transmission loss due to mismatching of the impedance can be reduced even if the input impedance of the Core-PLL 12A is different from the output impedance of the clock generator 21. Further, since the pair of voltage divider resistors RP2 and RP3 are used for impedance matching of the Core-PLL 12A, an increase in the cost can be substantially neglected and the transmission efficiency of the clock signal at the high frequency can be enhanced.

Figure 3:
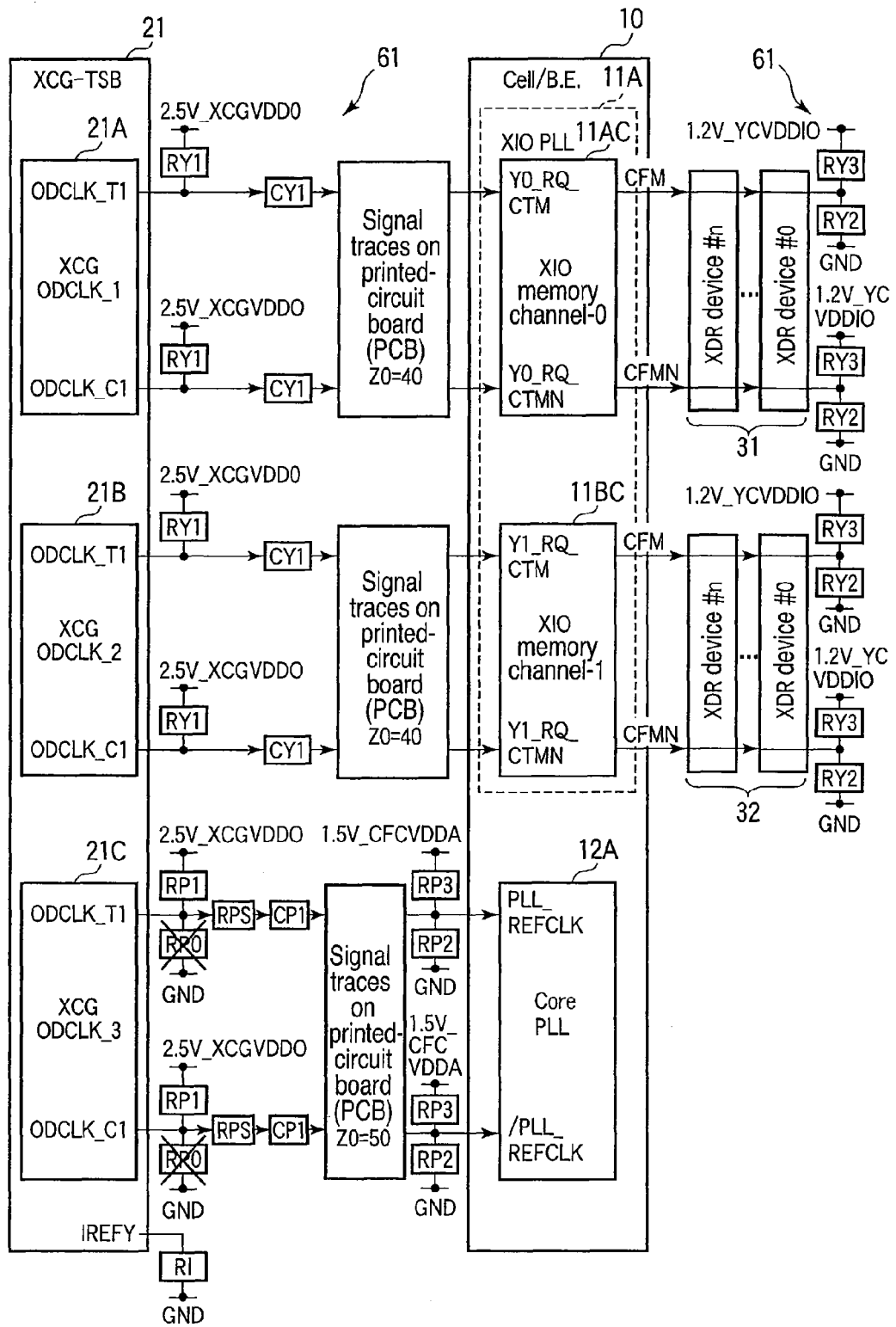
FIG. 3 is a diagram showing a concrete example of the configuration of the first clock supply apparatus shown in FIG. 2.

FIG. 3 shows a concrete example of the configuration of the first clock supply circuit 61 and FIG. 4 shows key parameters applied to the first clock supply circuit 61 shown in FIG. 3. In FIG. 3, three clock generation sources (XCG ODCLK-1, XCG ODCLK-2, XCG ODCLK-3) 21A to 21C among the four clock generation sources provided in the clock generator 21 are shown. Each of the clock generation sources 21A to 21C outputs a pair of complementary pulses of opposite phase as clock signals at the frequency of 400 MHz with the output impedance of 40Ω from output terminals ODCLK-T1, ODCLK-C1. The clock supply circuit 61 transmits the complementary pulses by means of a pair of differential lines.

The pull-up resistor RY1 and capacitor CY1 explained in FIG. 2 are provided for each of the paired differential lines respectively connected to the clock generation sources 21A and 21B. Further, the pull-up resistor RP1, capacitor CP1 and resistor RPS explained in FIG. 2 are provided for each of the paired differential lines connected to the clock generation source 21C. The differential line pair between the capacitors CY1 and the XIO-PLL 11A and the differential line pair between the capacitors CP1 and the Core-PLL 12A are signal traces on a printed-circuit board (PCB).

The differential line pairs for two clock signals output from the clock generation sources 21A and 21B are formed to extend to $0^{th}$ to $n^{th}$ XDR devices (XDR DRAMs) 31 and 32 via respective XIO memory channels 11AC and 11BC provided in the XIO-PLL 11A.

Further, the differential line pair for clock signals output from the clock generation source 21C is formed to extend to the Core-PLL 12A. In this case, the voltage divider resistors RY2 and RY3 are connected to each of the ends of the paired differential lines. The voltage divider resistors RP2 and RP3 are connected to each of the paired differential lines between the capacitors CP1 and the Core-PLL 12A. Resistors RP0 shown in FIG. 3 are conventionally provided, but in this embodiment, the resistors RP0 are not provided.

In the configuration shown in FIG. 3, the XIO-PLL 11A and Core-PLL 12A require clock signals of the same frequency with different impedance specifications. In order to attain plural clock signals supplied thereto, the clock generator 21 having three clock generation sources 21A to 21C incorporated in a single XCG chip can be used. In this case, it becomes unnecessary to respectively provide XCG chips with mutually independent output impedances for the XIO-PLL 11A and Core-PLL 12A unlike the conventional case. Therefore, it becomes possible to reduce the number of XCG chips and surrounding parts, reduce the occupied area thereof on the system circuit board and reduce the hardware cost. Further, since the number of clock generation sources that output clock signals of the high frequency (output frequency=400 MHz) in the system can be reduced, it is possible to attain the effect that the total power consumption of all the clock generation sources can be reduced and occurrence of a complication (EMI) due to spurious electromagnetic radiation can be suppressed.

This invention is not limited to the above embodiment and can be variously modified without departing from the technical scope thereof.

Figure 5:
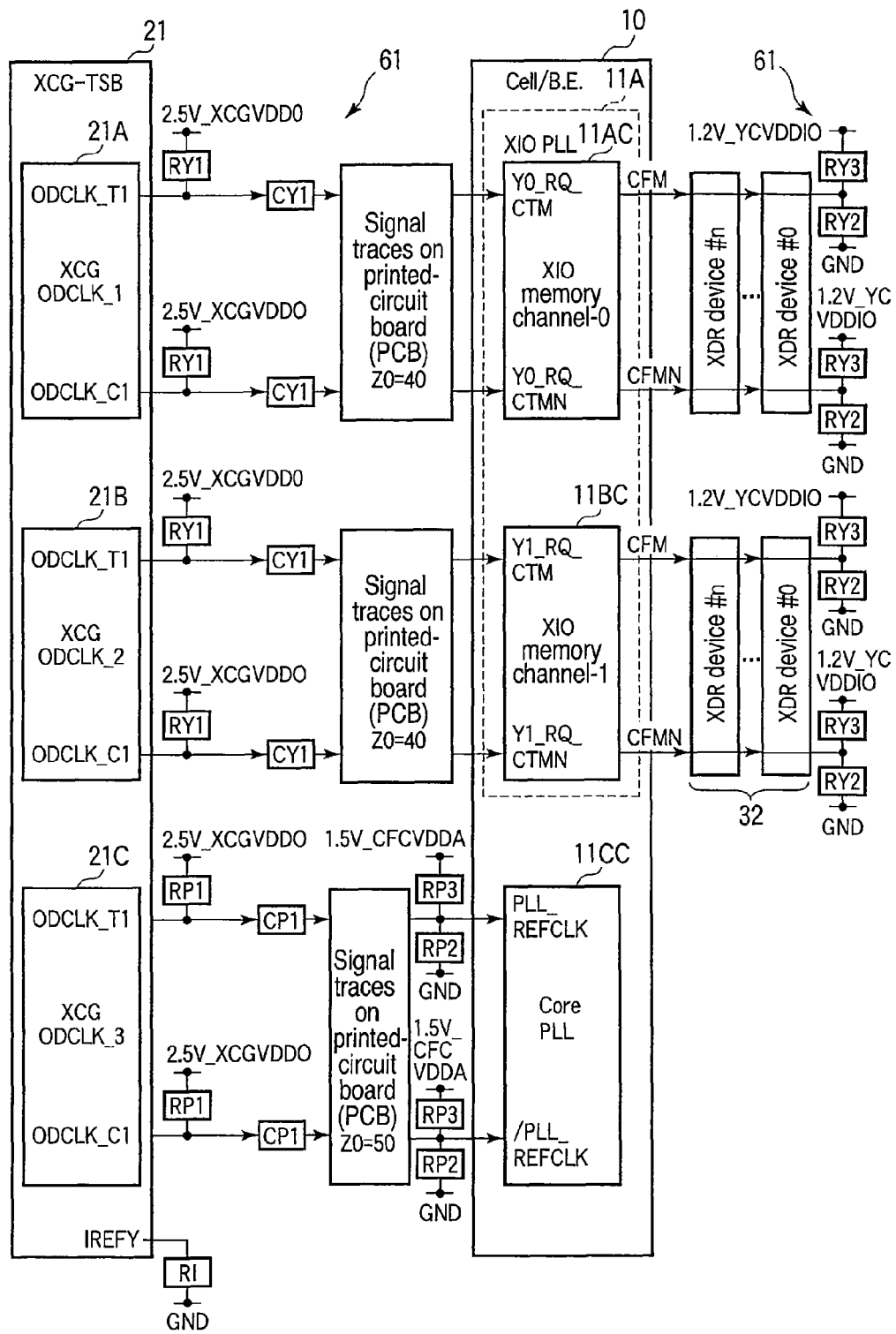
FIG. 5 is a diagram showing a modification of the first clock supply apparatus shown in FIG. 3.

FIG. 5 shows a modification of the first clock supply circuit 61 shown in FIG. 3, and FIG. 6 shows key parameters applied to the first clock supply circuit 61 of the modification shown in FIG. 5. In this modification, the resistor RPS shown in FIG. 3 is omitted as shown in FIG. 5, and instead, the resistance of the pull-up resistor RP1 shown in FIG. 5 is changed from 40.2 to 49.9Ω as shown in FIG. 6.

In the configuration shown in FIG. 5, since matching of the input impedance of the Core-PLL 12A can be attained by means of the voltage divider resistors RP2 and RP3 although the resistors RPS are not provided to reduce the number of parts, transmission loss due to mismatching of the impedance does not substantially occur.

Further, it is idealistic to set the constants of the resistors (and capacitors) to theoretical values, but it becomes possible to use general-purpose parts by selecting them according to values of standard numbers "E series" as shown in FIGS. 4 and 6.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A clock supply apparatus comprising:
    a first transmission line connected to a clock generator that generates clock signals,
    a second transmission line connected to a clock supply destination having input impedance different from output impedance of the clock generator,
    a capacitor that capacitively couples the first and second transmission lines,
    a pull-up resistor that is provided on the first transmission line to suppress reflection of the clock signal, and
    a pair of voltage divider resistors that apply potential obtained by voltage division to the second transmission line as reference potential of the clock signal,
    wherein the impedance of the pair of voltage divider resistors on the second transmission line is set to match the input impedance of the clock supply destination.

2. The clock supply apparatus of claim 1, further comprising a resistor inserted in part of the first transmission line that is closer to the capacitor side than the pull-up resistor to make the combined resistance thereof with the pull-up resistor matches the impedance of the second transmission line.

3. A clock supply method comprising:
    capacitively coupling a first transmission line connected to a clock generator that generates clock signals to a second transmission line connected to a clock supply destination having input impedance different from output impedance of the clock generator by means of a capacitor,
    suppressing reflection of the clock signal on the first transmission line by means of a pull-up resistor, and
    applying potential obtained by voltage division by means of a pair of voltage divider resistors to the second transmission line as reference potential of the clock signal, wherein the impedance of the pair of voltage divider resistors on the second transmission line is set to match the input impedance of the clock supply destination.

4. The clock supply method of claim 3, further comprising inserting a resistor in part of the first transmission line that is closer to the capacitor side than the pull-up resistor to make the combined resistance thereof with the pull-up resistor matches the impedance of the second transmission line.

* * * * *